Feb. 24, 1942.                W. H. FRANK ET AL                2,274,136
                        CONTINUOUS OUTLET CONSTRUCTION
                             Filed Feb. 17, 1940
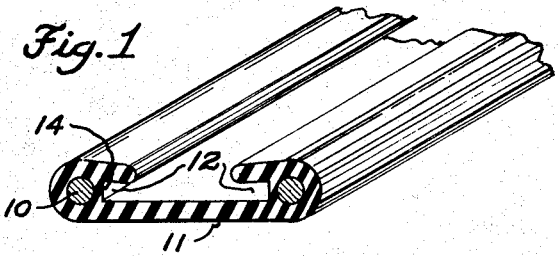
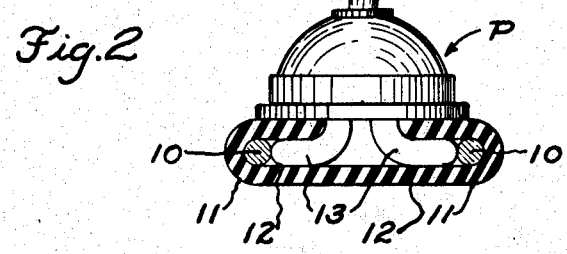
                                                        INVENTORS
                                                     William H. Frank
                                              BY  &  Arthur S. Bassette
                                                     Daniel G. Cullen Patented Feb. 24, 1942

2,274,136

UNITED STATES PATENT OFFICE 2,274,136

CONTINUOUS OUTLET CONSTRUCTION

William H. Frank and Arthur S. Bassette, Detroit, Mich., assignors to Bulldog Electric Products Company, Detroit, Mich., a corporation of West Virginia Application February 17, 1940, Serial No. 319,410

1 Claim. (Cl. 173—334.1)

This application relates to continuous outlet constructions of the type employing a conductor strip having conductors or bus bars therein for engagement with prongs of plugs interlocked and inserted into the strip for engagement with the bus bars.

Strip of this character is disclosed in a prior patent, No. 2,170,300 of August 22, 1939, and the instant application discloses variations and improvements in such strip.

One such improvement is the formation of the strip with means for closing the open sides of the grooves in which are disposed the bus bars, it having been found that provision of such closures enhances the utility of such strip, as will readily appear upon reference to the embodiment disclosed in the appended drawing, in which:

Fig. 1 shows strip equipped with closures in the form of easily openable membranes; and Fig. 2 shows a plug in place therein.

Referring to the drawing, it will be seen that it shows a conductor strip comprising two longitudinally extending laterally spaced parallel conductors or bus bars 10 embedded in ribbons 11 of insulation, with the facing grooves 12 of the strip, containing the bus bars at their bases, being deep and narrow for the reception of prongs 13 of plugs P designed properly for use with the strip here disclosed.

The two ribbons 11 of each strip are joined or integrated in some suitable manner, as indicated, to form a unitary conductor strip.

The strip may be made of a flexible insulating material such as thick soft rubber or the like.

Closures 14 for the open sides of the grooves and for concealing the bus bars 10 within them are provided, and are shown as formed of thin membranes integral with the ribbons and extending from one side of a groove to the other side of that same groove. The closures 14 may readily be opened or pierced by the ends of the prongs of the plugs used with the strip whereby the prongs may engage the bus bars, and when the strip is made of soft rubber or the like the pierced portions of the closures will automatically return to bus bar concealing positions.

Now having described the continuous outlet construction herein shown, reference will be had to the claim which follows.

We claim:

A continuous outlet construction comprising parallel bus bars, a hollow duct having a solid wall and a slotted wall connected at their edges by portions against which are disposed the bus bars, these being laterally remote from the free edges of the duct at the slotted wall, with the clear spaces between the solid wall and the separated parts of the slotted wall, each bounded by a bus bar and a free edge of the duct at the slotted wall, being no greater than the thickness of the bus bar measured in the same direction, in combination with connectors outside the duct and arranged with portions between the free edges of the duct and within the duct slot, and provided with laterally extending contact fingers disposed in and substantially filling the clear spaces aforesaid between the solid wall and the slotted wall of the duct to extend to the bus bars and with their ends engage the bus bars at their facing portions, the lateral distance between the bus bar engaging ends of the contact fingers being greater than the width of the duct slot, the latter being greater than the width of the contact fingers, whereby the connectors and fingers are insertable into the duct slot with the fingers in line with the duct slot and then rotatable 90° so that the fingers assume a position traversing the duct slot and at their ends engage facing sides of the bus bars, the duct providing a bearing and guiding surface for the connectors while they are being so rotated, and continuous insulating shields for the facing surfaces of the bus bars, normally shielding the bus bars and formed to be pierced by the ends of the connector fingers as these are inserted into the duct slot and twisted 90° to engage the bus bars.

WILLIAM H. FRANK.
ARTHUR S. BASSETTE.